United States Patent
Song et al.

(10) Patent No.: US 11,494,423 B1
(45) Date of Patent: Nov. 8, 2022

(54) GENERATING PARTIAL BOOLEAN QUERY RESULTS BASED ON CLIENT-SPECIFIED LATENCY CONSTRAINTS

(71) Applicant: Amazon Technologies, Inc., Seattle, WA (US)

(72) Inventors: Yang Song, Bellevue, WA (US); Venkata Sai Sriram Mahavadi, Lynwood, WA (US); Vaibhav Shivaji Shinde, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 17/015,904

(22) Filed: Sep. 9, 2020

(51) Int. Cl.
| | |
|---|---|
| *G06F 16/30* | (2019.01) |
| *G06F 16/33* | (2019.01) |
| *G06F 11/34* | (2006.01) |
| *G06F 16/335* | (2019.01) |
| *G06F 16/338* | (2019.01) |

(52) U.S. Cl.
CPC ...... *G06F 16/3341* (2019.01); *G06F 11/3419* (2013.01); *G06F 16/335* (2019.01); *G06F 16/338* (2019.01); *G06F 16/3349* (2019.01)

(58) Field of Classification Search
CPC .............. G06F 16/3341; G06F 16/338; G06F 16/3349; G06F 16/335; G06F 11/3419
See application file for complete search history.

(56) References Cited

U.S. PATENT DOCUMENTS

| | | | |
|---|---|---|---|
| 6,775,661 B1 * | 8/2004 | Redner | G06F 16/25 |
| | | | 707/770 |
| 8,515,954 B2 | 8/2013 | Gibbs et al. | |
| 8,849,799 B1 | 9/2014 | Zhao et al. | |
| 9,245,004 B1 | 1/2016 | Kamvar et al. | |
| 9,990,417 B2 | 6/2018 | Lowe et al. | |
| 10,382,300 B2 | 8/2019 | Ellenbogen et al. | |
| 2008/0288446 A1 * | 11/2008 | Hu | G06F 16/2462 |
| 2011/0202588 A1 * | 8/2011 | Aggarwal | H04W 4/20 |
| | | | 709/202 |

(Continued)

OTHER PUBLICATIONS

Dictionary.com definition of subset, by Dictionary.com, dated Dec. 1, 2021 (Year: 2021).*

(Continued)

*Primary Examiner* — Mahesh H Dwivedi
(74) *Attorney, Agent, or Firm* — Robert C. Kowert; Kowert, Hood, Munyon, Rankin & Goetzel, P.C.

(57) ABSTRACT

Systems and methods are disclosed to implement a Boolean query evaluation system that allows clients to specify a latency constraint for evaluating Boolean queries. In embodiments, the system evaluates queries using data from multiple external data sources. If some data sources fail to return data in a timely fashion to satisfy the specified latency constraint, the system will evaluate the query using the data that it was able to obtain and generate a partial answer to the query—a partial true or a partial false. In embodiments, the query response may include a reason for the partial answer, and indicate the list of data sources that failed to provide timely results. In embodiments, the system may publish a table indicating different latency constraints specified for a category of queries and the types of answers returned for those queries. Clients may use the table select latency constraints for future queries.

20 Claims, 10 Drawing Sheets

(56) References Cited

U.S. PATENT DOCUMENTS

| | | | | |
|---|---|---|---|---|
| 2012/0036011 A1* | 2/2012 | Schechter | ........... | G06F 21/6263 |
| | | | | 705/14.49 |
| 2012/0254219 A1 | 10/2012 | Bell | | |
| 2013/0007040 A1* | 1/2013 | John | ................... | G06F 16/2471 |
| | | | | 707/769 |
| 2013/0024442 A1* | 1/2013 | Santosuosso | ......... | G06F 16/245 |
| | | | | 707/720 |
| 2013/0262436 A1* | 10/2013 | Barsness | ........... | G06F 16/24549 |
| | | | | 707/718 |
| 2013/0311622 A1* | 11/2013 | Das Gupta | .............. | G06F 9/466 |
| | | | | 709/221 |
| 2014/0250103 A1* | 9/2014 | Barsness | ............... | G06F 16/245 |
| | | | | 707/718 |
| 2015/0331950 A1* | 11/2015 | Zhaung | ............. | G06F 16/24575 |
| | | | | 707/706 |
| 2019/0155963 A1* | 5/2019 | Boxwell | ........... | G06F 16/90335 |
| 2019/0294724 A1* | 9/2019 | Michelis | ........... | G06F 16/24534 |

OTHER PUBLICATIONS

Article entitled "Getting true/false from SQL query", by Hughes, dated Apr. 7, 2018 (Year: 2018).*

Article entitled "Max Query Timeout allowed by Denodo", by Denodo, dated Jun. 22, 2017 (Year: 2017).*

Article entitled "A Library of Reusable Model Components for Visual Simulation of the NCSTRL System", by Balci, dated 1998 (Year : 1998).*

* cited by examiner

GENERATING PARTIAL BOOLEAN QUERY RESULTS BASED ON CLIENT-SPECIFIED LATENCY CONSTRAINTS

BACKGROUND

The latency requirement of a query evaluation system can vary widely depending on the client and the usage situation. For example, a first client of a query evaluation system may expect to receive service responses within 500 milliseconds, while a second client may require responses in 100 milliseconds. Moreover, some clients have zero tolerance for inaccurate query results, while other clients may have a more relaxed policy towards results accuracy. Unfortunately, current query evaluation systems do not take into account the latency and accuracy requirements of different clients during query processing. If the system cannot completely determine a query result within a particular client's latency requirement period, the client will receive no response at all, even if the client is willing to sacrifice some degree of accuracy to obtain a slightly faster response. The rigid handling of client queries without regard for the clients' varying latency and accuracy requirements is a source of frustration for many users of current query evaluation systems.

Figure 1:
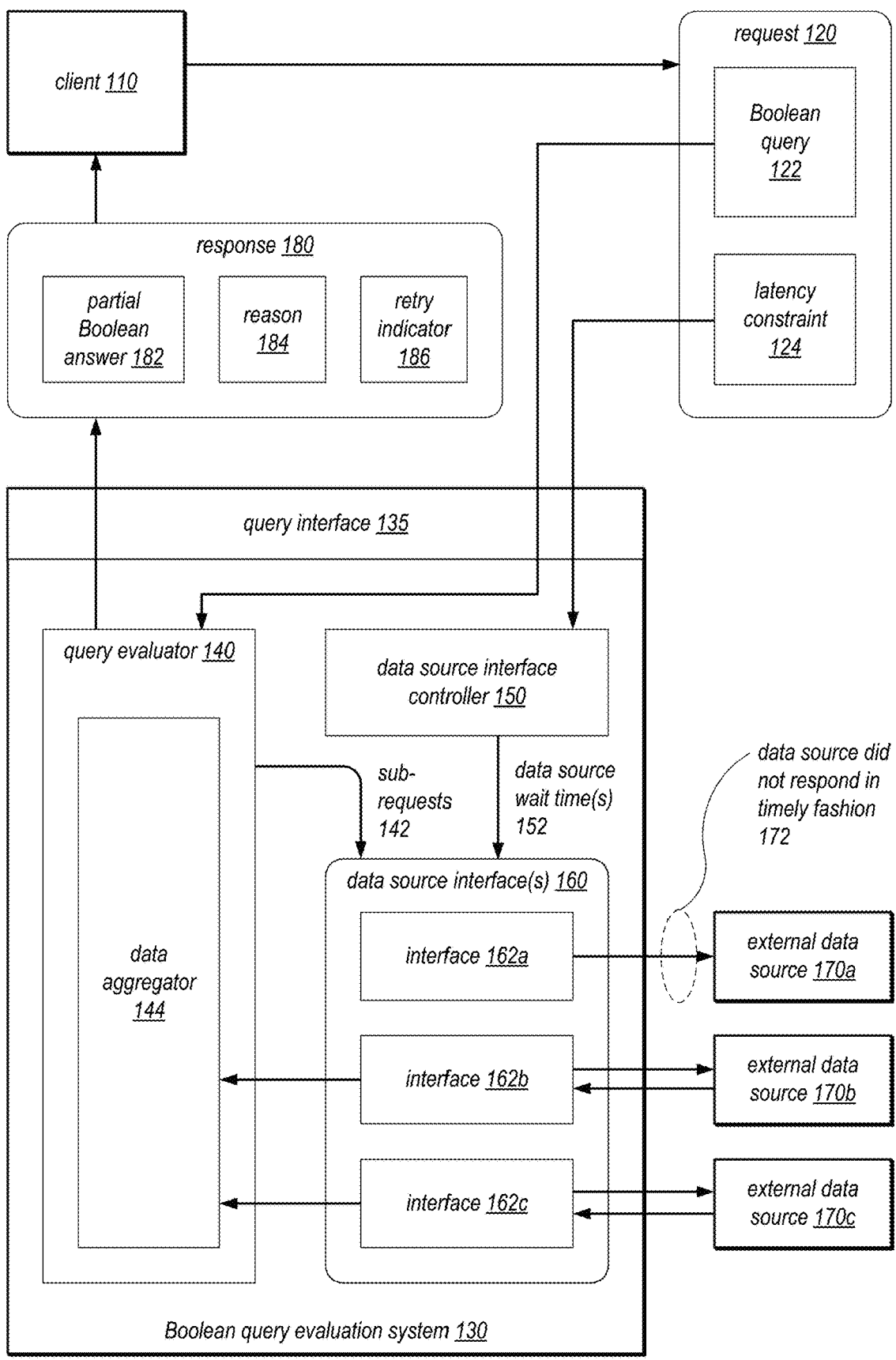
FIG. 1 is a block diagram illustrating a Boolean query evaluation system that is capable of returning a partial Boolean answer for a Boolean query according to client-specified latency constraint, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Systems and methods described herein may be employed in various combinations and in embodiments to implement a Boolean query evaluation system that is capable of returning partial Boolean answers for Boolean queries according to client-specified latency constraints.

When a client sends a query to a query evaluation system, a response will typically be received after some amount of latency. Query latency may vary for many reasons. For example, a query evaluation may cause the query evaluation system to access a number of external dependencies (e.g. external data sources or data resources), which can cause the overall query processing time to be highly unpredictable. Many clients of query evaluation system will limit the amount of latency that they are willing to tolerate by specifying a wait period for the query response. When the wait period expires, the client will abandon the query request.

The latency requirements of query clients can vary widely depending on the client and the usage situation. For example, a first client of a query evaluation system may expect to receive service responses within 500 milliseconds, while a second client may require responses in 100 milliseconds. Moreover, clients may also have different requirements regarding query result accuracy. Some clients have zero tolerance for inaccurate query results, while other clients may have a more relaxed policy towards results accuracy. Unfortunately, current query evaluation systems do not take into account the latency and accuracy requirements of different clients during query processing. If the system does not return a complete result to a query within a particular client's latency period (e.g. defined by a service level agreement), the client will simply abandon the query request. As a result, clients with very short latency requirements will often receive no query result at all, even if a client is willing to sacrifice some degree of result accuracy to obtain a slightly faster response. The rigid handling of client queries by current query evaluation systems is a source of frustration for many users of such systems.

Accordingly, to address these and other problems associated with conventional query evaluation systems, embodiments of a Boolean query evaluation system are disclosed capable of returning partial Boolean answers for Boolean queries according to client-specified latency constraints.

In some embodiments, the Boolean query evaluation system provides clients a query interface (e.g. a graphical user interface (GUI) or an application programming interface (API)) that allows clients to specify a latency constraint along with the Boolean query, indicating how long the client is willing to wait for the query response. The response from the Boolean query evaluation system may provide a complete Boolean answer (true or false), a partial Boolean answer (partial true or partial false), or an error, depending on how much data the system was able to obtain to perform the query evaluation during the latency period. In some embodiments, the query response may include a reason why a returned answer is partial (e.g. an indication that a particular data source was not able to provide data in a timely fashion). In some embodiments, the query response may also include a recommendation to retry the query, possibly with a different latency constraint.

In some embodiments, when the Boolean query evaluation system receives a request from a client, the system makes calls to external services, data sources, or other types of data resources in real time to retrieve data needed for query processing. Data retrieved from these external dependencies may be aggregated to produce a Boolean answer to the query. In some embodiments, if the system is able to fetch needed data from all external dependencies in a timely manner to satisfy the latency constraint, it will return a definitive or complete answer to the query (true of false). However, if the system cannot fetch all data within the latency constraint period, it will use the data that it was able to obtain to generate a partial answer to the query (partial true or partial false). In some embodiments, if the system cannot obtain a minimum threshold of data from the external dependencies within the latency constraint period (or if data could not be obtained from a required external data source), the system will return an error as response to the query.

Advantageously, the disclosed system improves the functioning of conventional query processing systems by giving clients the ability to control how a Boolean query is handled based on the specified latency constraint, thereby allowing clients to make tradeoff decisions between result accuracy and response latency for individual queries. Accordingly, the query evaluation system is able to appropriate handle queries under different types of latency constraints, including queries that have stringent latency requirements but lax accuracy requirements.

Advantageously, embodiments of the disclosed query evaluation system are able to programmatically adjust its own query processing behavior based on the client-specified latency constraint in order to process the query in the most efficient manner. For example, embodiments of the Boolean query processing system may be configured to calculate the wait times for its external dependencies based on the client-specified latency constraint. In some cases, the system may decide to forego data from certain external data sources or change the order in which the external data sources are accessed. In many cases, an execution plan to determining a partial answer for a Boolean query can drastically reduce resource utilization for both the query evaluation system and its external dependencies. In some embodiments, the behavioral adjustments of the Boolean query processing system may be configurable via a configuration interface of the system.

Advantageously, embodiments of the disclose query evaluation system are able to provide useful feedback to guide clients in selecting appropriate latency constraints. For example, embodiments of the Boolean query evaluation system may return a reason metadata that explains why a particular Boolean answer was partial. In some embodiments, the query response may also provide a retry indicator, indicating whether the query answer is likely to be improved with an immediate retry. In some embodiments, the query response may also indicate a recommended latency constraint to use for the retry request. In some embodiments, the system may track the latency constraints and returned answer types for a category of Boolean queries, and publish a summary of this data to the clients. The summary may indicate how answers returned for the query category (e.g. complete answers or partial answers) are affected by the choice of latency constraint, which may be used by clients to select the most appropriate latency constraint for new queries. As will be appreciated by those skilled in the art in light of disclosures below, the Boolean query evaluation system disclosed herein implements combinations of technical features to solve technical problems of current query evaluation systems and improves the functioning of such systems.

FIG. 1 is a block diagram illustrating a Boolean query evaluation system that is capable of returning a partial Boolean answer for a Boolean query according to client-specified latency constraint, according to some embodiments.

As shown, the figure depicts a Boolean query evaluation system 130 and a client 110. The client 110 issues a request 120 to the Boolean query evaluation system 130 specifying a Boolean query 122, and in turn, the Boolean query evaluation system returns a response 180 indicating a partial Boolean answer 182.

In various embodiments, the components shown in the figure may be implemented directly using computer hardware, as software instructions executable by computer hardware, or using a combination of hardware and software. In some embodiments, the Boolean query evaluation system 130 may be implemented by a system that includes a number of connected computing nodes, each of which may be similar to the computer system embodiment illustrated in FIG. 9 and described below. In various embodiments, the functionality of a given component may be implemented by a particular node or distributed across several nodes. In some embodiments, a given node may implement the functionality of more than one component in the figure.

Generally speaking, the client 110 may encompass any type of client configurable to submit query requests (e.g. request 120) to Boolean query evaluation system via a computer network. For example, a given client 110 may include a suitable version of a web browser, an application such as a database client, or any other application that may be configured to issue Boolean queries (e.g. Boolean query 122) to the query evaluation system. In some embodiments, the client 110 may implement a communication protocol (e.g., Hypertext Transfer Protocol (HTTP)) for generating network-based services requests. In some embodiments, the client 110 may generate network-based services requests according to a Representational State Transfer (REST)-style web services architecture, a document- or message-based network-based services architecture, or another suitable network-based services architecture.

In some embodiments, the Boolean query evaluation system 130 may be implemented as a service that waits for and responds to query requests from clients. The query evaluation system 130 may implement one or more service endpoints to implement a query interface such as query interface 135. In some embodiments, the Boolean query evaluation system 130 may be implemented as part of a database system. In some embodiments, the Boolean query evaluation system 130 may be an aggregator service that aggregates data from other services or data sources. In some embodiments, the Boolean query evaluation system 130 may be configured as a number of distinct systems to provide a variety of different services to clients.

As shown in this example, the request 120 includes two components. The Boolean query 122 is a query that poses a true or false question. For example, a Boolean query may ask whether a particular user meets a set of filtering conditions. As another example, a Boolean query may ask whether a particular bank account passes a set of audit tests. Depending on the embodiment, the Boolean query may be specified in a query language, according to an API, or as user input submitted through a GUI.

In some embodiments, the latency constraint 124 is used to indicate the response latency that the client is willing to tolerate for the Boolean query 122. In some embodiments, the latency constraint 124 may indicate a maximum latency time (e.g. 500 milliseconds) that will be acceptable to the client. In some embodiments, the latency constraint may be specified as a formula that depends on other runtime factors. In some embodiments, the specified latency constraint may be relative a reference time, such as the time when the client issued the request, the time when the request is received by the Boolean query evaluation system, etc.

As shown, in some embodiments, the request 120 is received via the query interface 135 provided by the Boolean query evaluation system 130. In some embodiments, the query interface 135 may be a service interface or some other programmatically invocable interface such as an API. In this example, the Boolean query 122 and the latency constraint 124 are provided as a single request. In other embodiments, the two components may be specified separately (e.g. as two separate requests or configuration settings). In some embodiments, the Boolean query evaluation system 130 will ensure that requests received via the query interface 135 will be provided a response 180 within a latency period in accordance with the specified latency constraint 124.

As shown in this example, the Boolean query evaluation system 130 implements a number of components, including a query evaluator 140, a data source interface controller 150, and multiple data source interfaces 160. As shown, the Boolean query 122 is consumed by the query evaluator 140. The query evaluator 140 processes the query by sending sub-requests 142 to a set of external data sources 170a-c through respective data source interfaces 162a-c. When response data is received from the external data sources 170a-c, they are aggregated by the data aggregator 144 to generate the query response 180. In some embodiments, if response data is received from all external data sources 170a-c in a timely fashion to satisfy the latency constraint 124, the query evaluator 140 will return a complete answer for the Boolean query (e.g. a true or a false).

As shown, the latency constraint 124 is consumed by the data source interface controller 150. In some embodiments, the data source interface controller 150 may be tasked with calculating wait times 142 for each external data source 170a-c based on the specified latency constraint 124. For example, the controller 150 may allocate portions of a specified latency period among different data stores 170 that are sequentially accessed. In some embodiments, the wait times 152 may vary depending on properties of the data source. For example, a data store that is in a same local area network as the query evaluation system may be assigned a relatively short wait time, while a data source that is in a remote network may be assigned a longer wait time. These wait times 152 will dictate how long each interface 162a-c will wait to receive data from its respective external data source 170a-c.

As shown in this example, one of the external data sources (data source 170a) did not respond 172 in a timely fashion. For example, data source 170a did not provide a response to its sub-request within the wait period 152 assigned to interface 162a. As a result, no response data from data source 170a is provided to the data aggregator 144. When this occurs, in some embodiments, the data aggregator 144 will aggregate the incomplete data that was obtained in time (e.g. from data sources 170b and 170c), and generate a partial Boolean answer 182 based on the incomplete data (a partial true or a partial false).

In some embodiments, the Boolean query 122 may be composed of multiple sub-queries, which may also be Boolean queries posing true-or-false questions. In some embodiments, these sub-queries are submitted to the external data sources as the sub-requests 142, and query evaluation system will generate the Boolean answer by aggregating or combining the results of the sub-queries. In some embodiments, a partial Boolean answer will be generated when the system fails to receive results of a sub-query in a timely fashion. In some embodiments, the partial Boolean answer 182 may indicate to the client the most probable answer to the Boolean query based on external source data that was received in time. At the same time, the partial Boolean answer indicates that the system did not fully evaluate the query due to missing data from some of the external data sources. In some embodiments, the Boolean query evaluation system 130 may be configured to return different types of partial answers that indicate different levels of uncertainty of the answer (e.g. a high-confidence partial true, a low-confidence partial true, etc.).

As shown, in some embodiments, the generated response 180 may include metadata in additional to the partial Boolean answer 182, such as a reason 184 and a retry indicator 186. In some embodiments, the reason field is used to indicate the reason why the returned answer is partial. For example, the reason field 184 may indicate one or more external data sources that did respond to a data request in a timely fashion during query processing.

In some embodiments, the response 180 may include a confidence indicator (not shown) that indicates a confidence level of the partial answer. For example, the confidence indicator may provide a quantitative value (e.g. from 1 to 100) that indicates the certainty of a partial answer. The confidence level may be calculated in a number of ways depending on the embodiment. For example, the confidence level may depend on factors such as the number of data sources that did not provide response data, the importance of these data sources, the estimated staleness of data that was used, etc. In some embodiments, an answer above a first certainty threshold will be returned as a complete answer, while an answer below a second certainty threshold will be returned as an error. In some embodiments, the manner that the confidence level is calculated may be configurable via a configuration interface of the query evaluation system.

In some embodiments, the retry indicator 186 may provide an indication whether a retry of the Boolean query is likely to improve the accuracy of the answer (e.g. a definitive answer). For example, in some situations, the query evaluation system 130 may determine that although a particular data source did not provide a timely response during the query evaluation, the data source is up and running and that a retry of the query will likely obtain a response from the data source. In some embodiments, the retry indicator 186 may specify a recommended latency constraint (e.g. a longer latency period) to be used in the retry attempt, based on the system's recent interactions with the data sources. The client 110 may use the metadata in the response to make informed decisions about how to interpret the partial answer, whether to attempt a retry, and if so, what latency constraint to use for the retry.

In some embodiments, the retry indicator 186 will include a unique identifier (e.g. a partial result ID), which can be used by the query evaluation system to refer to evaluation data obtained during the initial evaluation of the query. For example, in some embodiments, the query evaluation system may temporarily store some evaluation data such as the query execution plan, intermediate results, etc., so that they can be reused for a retry query. Such data can be used to improve the performance of the retry request. In some embodiments, such data may be erased by the query evaluation system after a configured amount of time, or periodically garbage collected.

In some embodiments, if a response data cannot be obtained from a threshold minimum set of external data sources 170*a-c*, the query evaluation system 130 will return an error as the answer, instead of a complete or partial answer. For example, an error may be returned if a configured proportion (e.g. a majority) of the data sources 170*a-c* failed to return a timely response. As another example, an error may be returned if one of a set of required data sources does not return a timely response. In some embodiments, an error answer may be associated with a reason field or a retry indicator, similar to the partial answer 182.

In some embodiments, instead of a separate reason field or retry indicator, metadata information about an answer may be encoded as part of the answer itself. For example, embodiments of the query evaluation system may return different flavors or types of partial or error answers (e.g. a retriable/non-retriable answer) that indicate the information conveyed by the reason field 184 or retry indicator 186. In some embodiments, responses may be implemented as distinct classes or data structures to represent the different answer types.

Figure 2A:
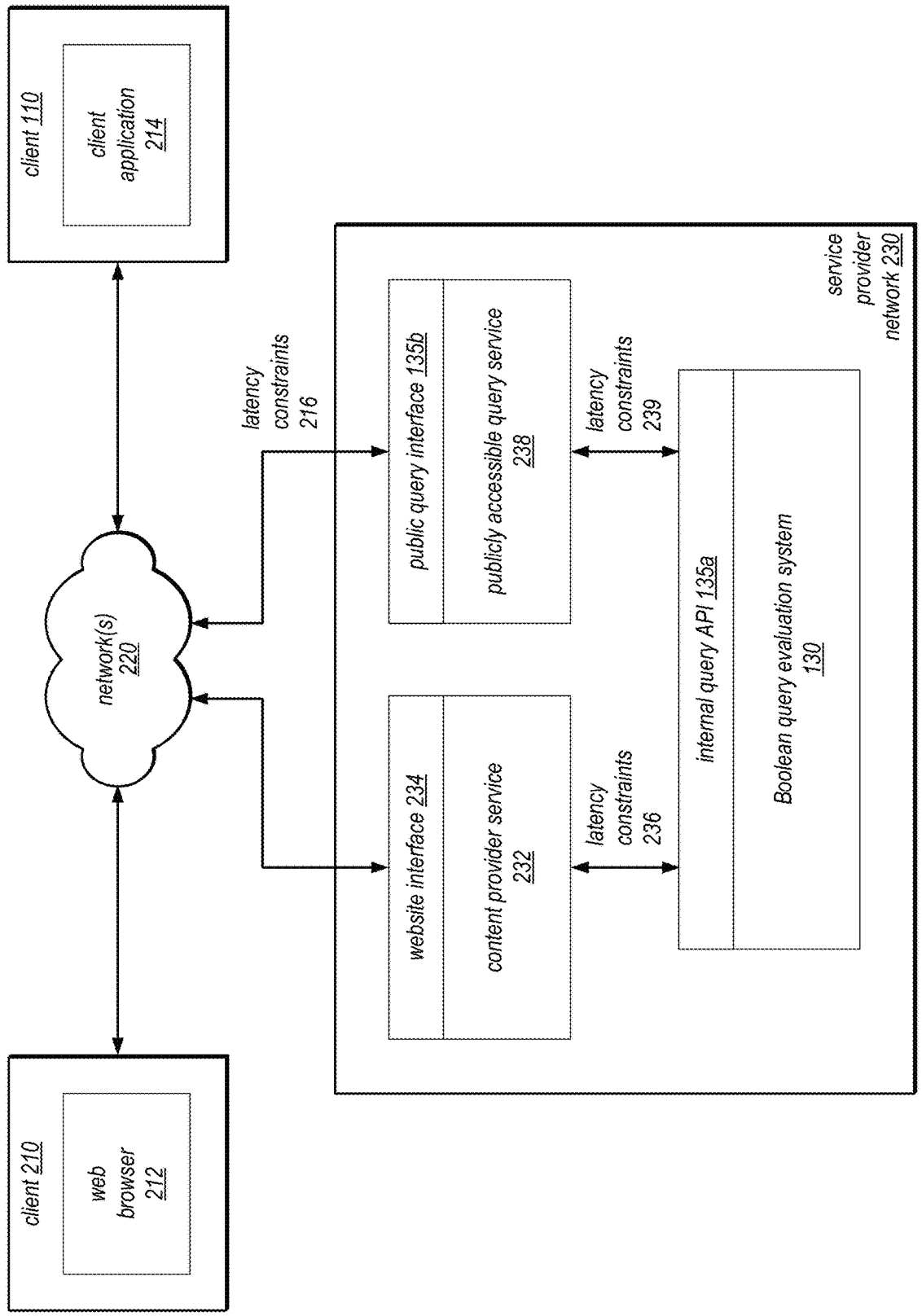
FIG. 2A is a block diagram illustrating a service provider network that implements a number of services using a Boolean query evaluation system configured to receive client-specified latency constraints, according to some embodiments.

FIG. 2A is a block diagram illustrating a service provider network that implements a number of services using a Boolean query evaluation system configured to receive client-specified latency constraints, according to some embodiments.

As shown, the figure depicts two clients 110*a* and 110*b* interacting with services within a service provider network 230 over one or more networks 220. Client 110*a* is a client computer system that is executing a web browser 210. The web browser is configured to interact with a service such as the content provider service 230. Client 110*b* is another client computer system that implement a client application 212. Client application 212 is configured to make programmatic calls over the network 220 to a service such as the public accessible query service 238.

In various embodiments, the network(s) 220 may encompass any suitable combination of networking hardware and protocols necessary to establish network-based communications between clients and the service provider network 230. In some embodiments, the network 220 may include a public network such as the Internet. In some embodiments, the network may include private networks such as local area networks (LANs) or wide area networks (WANs) operated by a private entity. In some embodiments, the network may include various hardware (e.g., modems, routers, switches, load balancers, proxy servers, etc.) and software (e.g., protocol stacks, firewall/security software, etc.) needed to establish a networking link between clients and the service provider network 230. In some embodiments, the client and the service provider network 230 may be respectively provisioned within enterprises having their own internal networks. In such embodiments, the network 220 may include the hardware (e.g., modems, routers, switches, load balancers, proxy servers, etc.) and software (e.g., protocol stacks, accounting software, firewall/security software, etc.) necessary to establish a networking link between the clients and the Internet as well as between the Internet and service provider network.

As shown, the service provider network 230 provides a content provider service 232. In some embodiments, the content provider service may be provided using a web interface 234, which presents a website interface 234 (e.g. an HTTP interface) to the clients. As shown, the content provider service 232 interacts with an embodiment of the Boolean query evaluation system 130, for example, to send Boolean queries to the Boolean query evaluation system. In this example, the Boolean query evaluation system provides an internal query API 135*a*, which is an embodiment of the query interface 135 of FIG. 1. Using the internal query API 135*a*, the content provider service 232 can issue Boolean queries to the system with specified latency constraints 236, making the service 232 a client 110 of the Boolean query evaluation system 130. By specifying the latency constraints 236 for its own queries, the content provider service 232 is better able to control the response latency to its own clients (e.g. client 210). For example, when the content provider service is experiencing a high volume of requests, it may choose to return faster but less precise content by tightening the latency constraints 236. On the other hand, when the request volume is low, the content provider service may choose to use a more relaxed latency constraint to provide slower but more precise content.

As shown, the service provider network 230 also implements a publicly accessible query service 238, which implements a public query interface 135*b*. The public query interface may be a web service interface or a network-based protocol interface that is designed to work with the client application 214. In some embodiments, the public query interface 135*b* may be an interactive interface such as a GUI. As shown in this example, the public query interface 135*b* allows the client application 214 to specify latency constraints 216, similar to the query interface 135 of FIG. 1. Accordingly, the client application 214 is able to use these constraints 216 to control the accuracy versus latency tradeoff of response from the public accessible query service 238.

As shown in this example, the publicly accessible query service 238 uses the Boolean query evaluation system 130 as an external data source or dependency. Accordingly, the publicly accessible query service may employ latency constraints 239 when issuing Boolean queries to the Boolean query evaluation system. In some embodiments, the latency constraints 239 may be calculated by the publicly accessible query serviced based on its received latency constraints 216. In some embodiments, the latency constraints 239 may be a calculated data source wait time 152 as discussed in connection with FIG. 1.

Figure 2B:
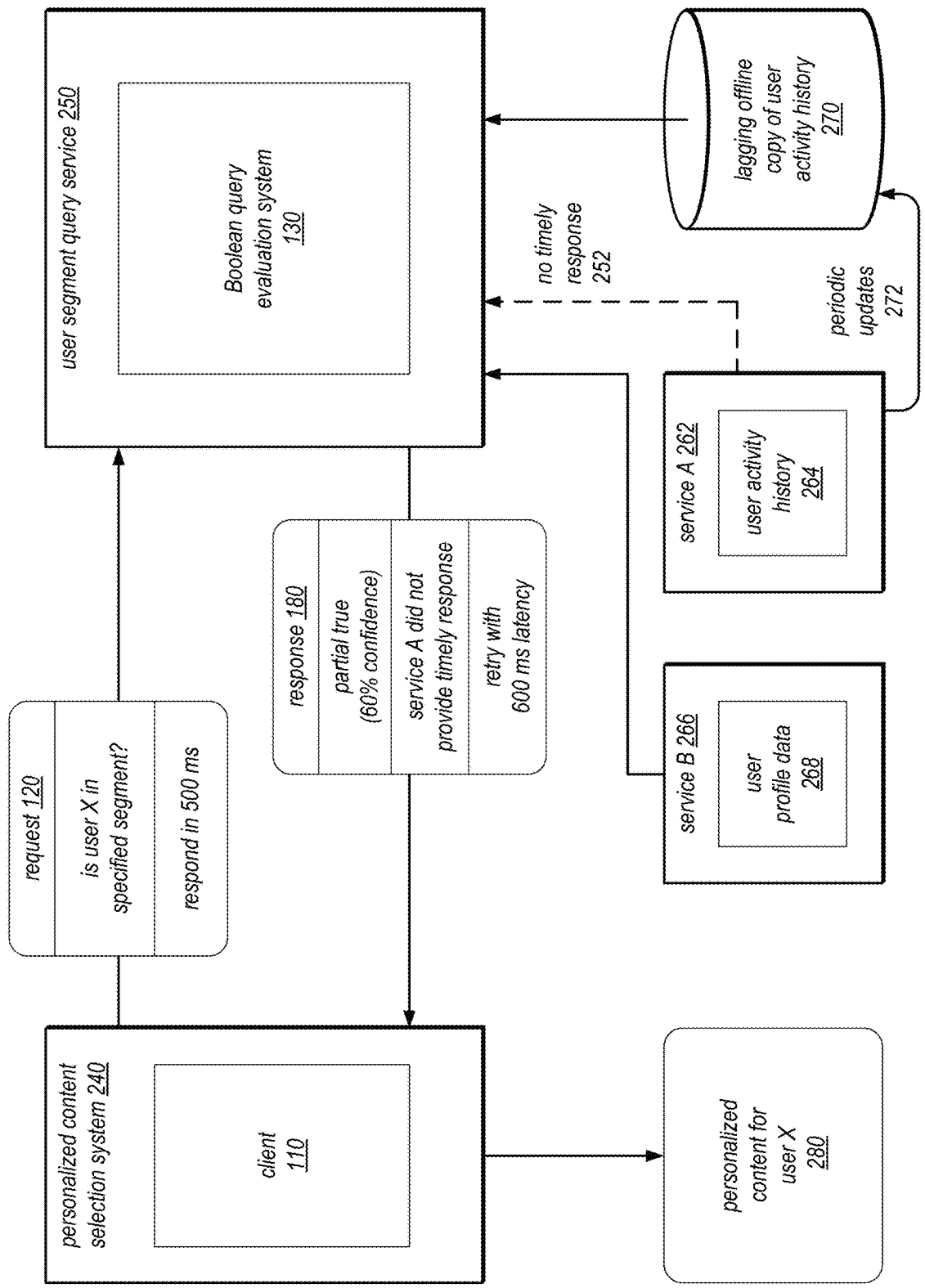
FIG. 2B is a block diagram illustrating a user segment query service that is configured to return partial Boolean answers for Boolean queries according to client-specified latency constraints, according to some embodiments.

FIG. 2B is a block diagram illustrating a user segment query service that is configured to return partial Boolean answers for Boolean queries according to client-specified latency constraints, according to some embodiments.

As shown, the figure depicts a personalized content selection system 240 that interfaces with a user segment query service 250. The personalized content selection system 240 implements the client 110 of FIG. 1, and the user segment query service 250 implements the Boolean query evaluation system 130 of FIG. 1.

In some embodiments, the personalized content selection system 240 is configured to send query requests (e.g. request 120) about individual users to the user segment query service 250. An example query may ask whether a particular user X is in a specified user segment. In some embodiments, a user segment may be defined by a set of user characteristics (e.g. a certain age limit, etc.), which may be specified in the query request. As shown in this example, the request 120 also instructs the service 250 to respond to the query within 500 milliseconds. This instruction is one example of a latency constraint 124 discussed in connection with FIG. 1.

The user segment query service 250 is configured to respond to the query by evaluating the query and returning a Boolean answer (true or false) or partial Boolean answer (partial true or partial false) in accordance with the latency constraint. As shown in this example, the user segment query service 250 accesses three different external dependencies 262, 266, and 270 during processing of the query. These external dependencies are examples of the external data sources 170 of FIG. 1. Service A 262 is a service that stores user activity history 264 of users. As shown, service A was not able to provide a timely response 252 to the user segment query service 250. Service B 266 is a different service that stores user profile data 268 about users, and it did provide a timely response to the user segment query service. Finally, data source 270 (a lagging offline copy of the user activity history data) was also used during the query evaluation. In some embodiments, such offline copies of external data may be maintained by the user segment query service as a fallback when the primary data source (e.g. service A) fails to provide a timely response. The lagging offline data store 270 may be periodically updated 272 to synchronize with the online copy of the data 264 at the primary data source, and represents a slightly out-of-date version of the online copy of the data. In some embodiments, the offline copy 270 may be maintained as locally accessible data to the Boolean query evaluation system, so that it can be readily accessed by the system with very little latency.

Because service A did not provide timely data to the user segment query service in this example, the response 180 could only provide a partial answer to the query (partial true). The response 180 indicates a confidence level of 60% the partial answer, which may be calculated during the query evaluation process based on the amount and/or character of missing input data or intermediate results. As shown, the response 180 indicates that service A did not provide a timely response as a reason for the partial answer. Additionally, the response 180 indicates that the client could retry the query with a 600-millisecond latency constraint for an improved answer (e.g. an answer with a higher confidence level). The recommendation may be based on recent knowledge of the user segment query service that service A is likely to provide a timely response under this more relaxed latency constraint.

As shown, the personalized content selection system 240 in this example uses the response 180 to select personalized content 280 for user X. For example, the personalized content selection system 240 may select a particular song, a movie, or a targeted advertisement for user X based on the determination that user X is part of the user segment specified in the query request 120. As will be understood by those in the art, the Boolean query evaluation system described herein may be used to support many other types of query application or use cases, in additional to the example shown here.

Figure 3:
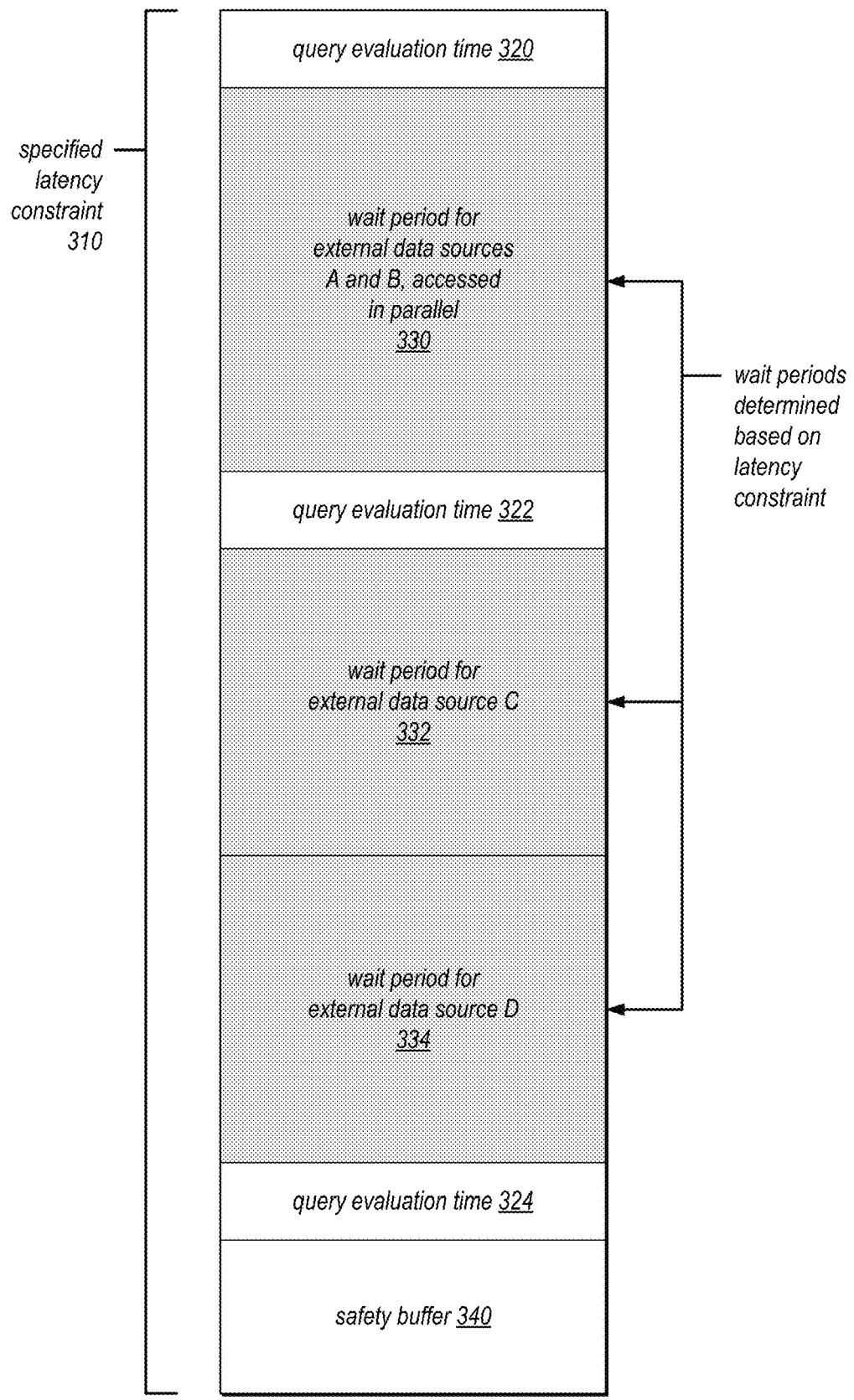
FIG. 3 illustrates a dynamic calculation of wait periods for external data sources that are accessed during the processing of a Boolean query, according to some embodiments.

FIG. 3 illustrates a dynamic calculation of wait periods for external data sources that are accessed during the processing of a Boolean query, according to some embodiments. The depicted calculation of FIG. 3 may be carried out by an embodiment of the data source interface controller 150 of FIG. 1.

FIG. 3 depicts how an example latency period specified by a latency constraint 310 is apportioned among different steps of the query evaluation process. As shown, the process is divided into a number of query evaluation steps and data access steps. In some embodiments, the query evaluation steps are executed by components of the Boolean query execution service, and their execution times known to within a fair degree of precision. As shown, the query evaluation steps are each assigned a portion of the latency constraint period (query evaluation times 320, 322, and 324) based on their expected execution times. In some embodiments, the data access steps will access external data sources (e.g. data sources A, B, C, and D) that are not controlled by the query evaluation system. The wait times for the external data sources may not be precisely known. Accordingly, these wait periods are calculated based on the specified latency constraint period and the execution times of the query evaluation steps (e.g. by a component such as the data source interface controller 150 of FIG. 1). In this example, the calculated wait times (wait periods 330, 332, and 334) are also shown as portions of the latency constraint period.

In some embodiments, the wait periods 330, 332, and 334 are determined by first subtracting the total query evaluation time (total of periods 320, 322, and 324) from the latency constraint period 310. In some embodiments, an additional safety buffer period 340 is also deducted. The safety buffer 340 may be used to account for unexpected time expenditures incurred during the query evaluation process. In some embodiments, the length of safety buffer period 340 may be a configurable value. After the query evaluation and buffer periods are deducted from the latency constraint period, the remaining time is divided among the wait periods for the external data sources.

As shown in this example, external data sources A and B are accessed in parallel. Accordingly, the system calculates a single wait period 330 for the two data sources. On the other hand, data sources C and D are accessed sequentially. Accordingly, the system calculates two different wait periods 332 and 334 for two the data sources. In some embodiments, the wait times assigned to the data sources can vary based on the characteristics of an individual data source or other runtime factors. For example, a data source that is remote from the query evaluation system may be assigned a longer wait time than a data source that is locally accessible by the query evaluation system. As another example, a data source may be assigned a longer wait period during a peak demand period of the data source. In some embodiments, various parameters of the wait time calculation may be controlled via a configuration interface of the query evaluation system.

In some embodiments, the wait periods 330, 332, and 334 may be determined at the outset of the query evaluation process. In other embodiments, the wait periods may be calculated at later points during the query evaluation process, as the process unfolds. For example, in some cases, the query evaluation system may not know which data sources will be accessed when the evaluation process begins. Accordingly, embodiments of the query evaluation system will calculate the wait periods on an as-needed basis, when each data source is accessed. In some embodiments, the query evaluation system may elect to omit a data source if there is insufficient time remaining in the latency constraint period to access that data source.

Figure 4A:
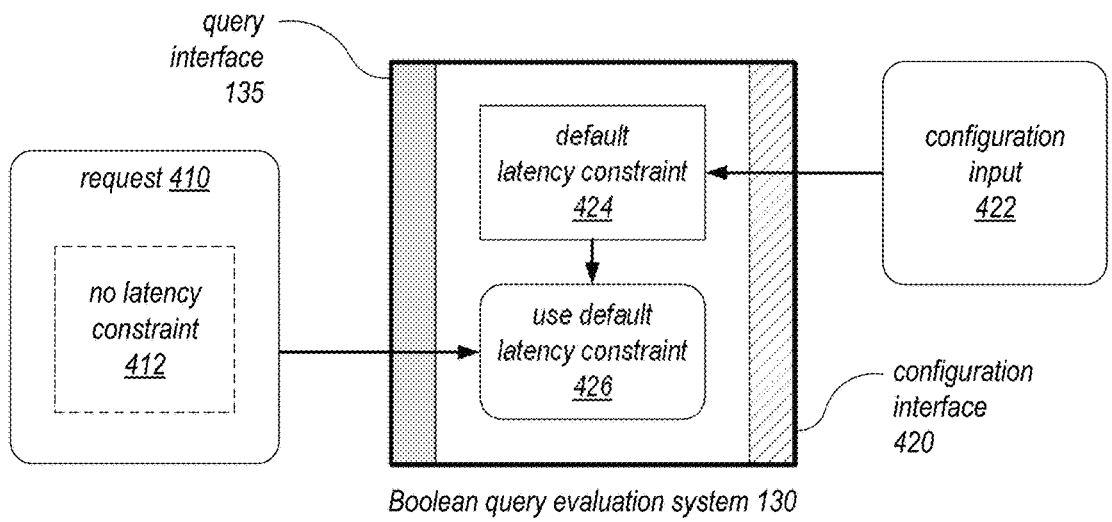
FIGS. 4A to 4C illustrate different types of configuration parameters that control the behavior of query processing performed by the Boolean query evaluation system, according to some embodiments.
Figure 4B:
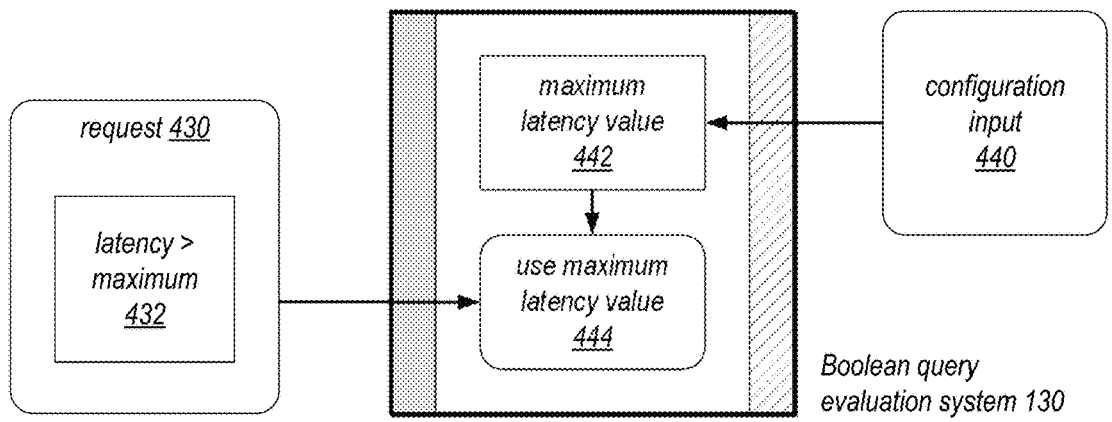
Figure 4C:
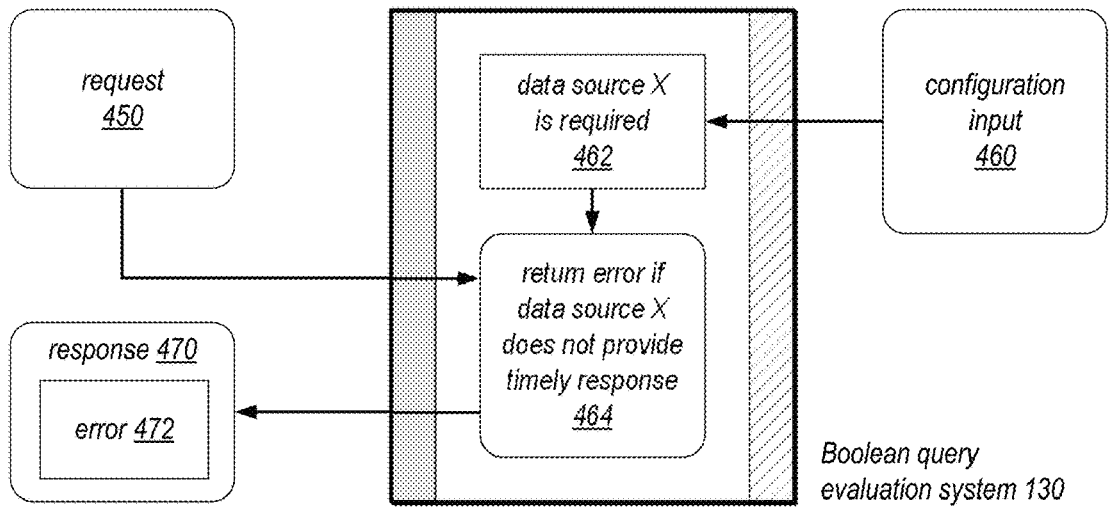

FIGS. 4A to 4C illustrate different types of configuration parameters that control the behavior of query processing performed by the Boolean query evaluation system, according to some embodiments.

FIG. 4A depicts an embodiment of the Boolean query evaluation system 130. The system 130 implements a query interface 135 as discussed in connection with FIG. 1, and a configuration interface 420 that is used to receive configuration input (e.g. configuration input 422). Depending on the embodiment, the configuration interface 420 may be implemented as a GUI, a programmatic interface such as an API, a configuration file or database, or some other type of configuration mechanism. In this example, the configuration input 422 specifies a default latency constraint 424, which will be used 426 as the latency constraint when a query request 410 species no latency constraint 412. Thus, in some embodiments, the latency constraint will be an optional parameter of the query interface that does not need to be explicitly specified by the client. Depending on the embodiment, default latency constraints may be configured for a particular client, a particular type of query, a particular period of time, for the Boolean query evaluation system 130 as a whole, or any combination of the foregoing.

In some embodiments, the Boolean query evaluation system may operate under two different modes. Under a first (e.g. legacy) mode, the system will not recognize any client-specified latency constraints. Under a second (e.g. newer) model, the system will honor the latency constraints specified for incoming queries. In some embodiments, the system may permit clients to specify, via the query interface 135 or the configuration interface 420, which mode to use to handle incoming queries. In some embodiments, if the first mode is indicated by the client, the query evaluation system will simply use the default latency constraint 424 regardless of any latency constraints specified by the client. In some embodiments, the default latency constraint may be a static limit on response latencies specified in the SLA associated with the client.

FIG. 4B depicts an embodiment of the Boolean query evaluation system 130, also having a query interface and a configuration interface as discussed in connection with FIG. 4A. In this example, the configuration input 440 is used to specify a maximum latency value 442 for the system (e.g. the maximum latency period for processing queries). If a request 430 specifies a latency constraint that indicates a latency period 432 greater than the maximum, the Boolean query evaluation system will ignore the client-specified latency value and use 444 the previously configured maximum latency value instead. In some embodiments, a similar minimum or floor latency value may be configured for the system, so that any client-specified latency less than the minimum will be replaced by the minimum. Depending on the embodiment, these maximum or minimum values for the latency period may be configured for a particular client, a particular type of query, a particular period of time, for the Boolean query evaluation system 130 as a whole, or any combination of the foregoing.

FIG. 4C depicts another embodiment of the Boolean query evaluation system 130, which also implements a query interface and a configuration interface as discussed in connection with FIGS. 4A and 4B. In this example, the configuration input 460 designates a particular data source X as a required data source. In some embodiments, data sources that are designated as required sources must provide a response in a timely fashion during the query evaluation process, or the system 130 will return 464 an error in response to the query. In this example, data source X did not return a timely response during the processing of query request 450. Accordingly, the returned response 470 indicates an error 472 for the query. In some embodiments, the Boolean query evaluation system may be configured to implement a variety of rules for when the response will indicate an error instead of an answer. As just one example, the query evaluation system may return an error whenever the majority of a group of data sources fails to provide a timely response.

Figure 5A:
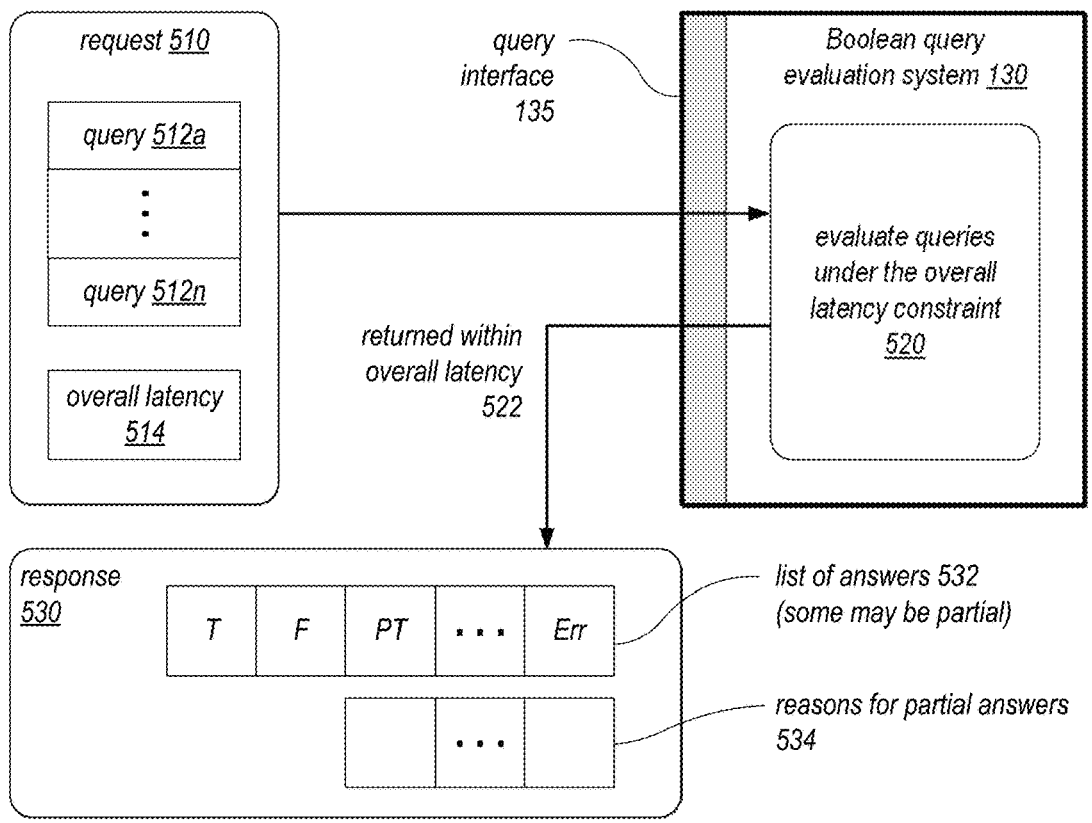
FIGS. 5A and 5B illustrate different types of Boolean query requests that can be handled by the Boolean query evaluation system and associated Boolean query responses, according to some embodiments.
Figure 5B:
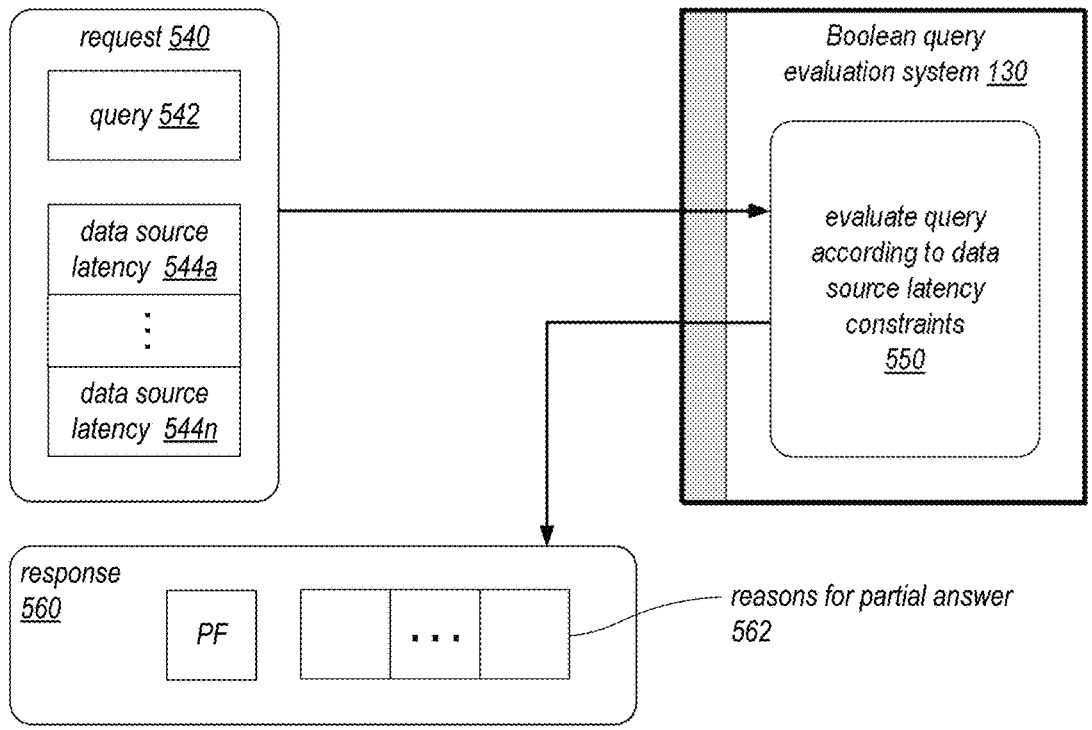

FIGS. 5A and 5B illustrate different types of Boolean query requests that can be handled by the Boolean query evaluation system and associated Boolean query responses, according to some embodiments.

FIG. 5A depicts an embodiment of the Boolean query evaluation system 130 that is configured to accept query requests (e.g. request 510) that specify multiple Boolean queries (e.g. queries 512*a*-512*n*). As shown, the request 510 in this example indicates an overall latency 514 for the queries 512*a-n*. Request 510 is received by the system 130 via the query interface 135, and the system will evaluate 520 all the queries under the overall latency constraint 514. Depending on the embodiment, the query evaluation system 130 may evaluate the queries sequentially in their specified order, in parallel, or in some other manner (e.g. in a random order). However, no matter the order of evaluation, an overall response 530 to the queries will be returned 522 in accordance with the overall latency constraint 514.

As shown, the response 530 will indicate a list of Boolean answers 532 for each of the queries 512*a-n* in the request. The list of answers may include complete Boolean answers, partial Boolean answers, and/or errors. In this example, the response 534 also indicates a list of reasons for each partial answer or error. A reason field 534 may indicate certain data stores that could not be accessed in a timely fashion during evaluation of an individual query. In some embodiments, the response 530 may also indicate an overall retry indicator for the request 510. The retry indicator may recommend to retry the request 510 by breaking up the queries 512*a*-512*n* into multiple separate requests.

The table below provides a section of example computer code implemented by a client (e.g. client 110) of the Boolean query evaluation system 130. In the example code, the client interacts with the API of by the query evaluation system to issue a query request of multiple Boolean queries. The queries are Boolean queries that asks whether a user "bob" (line 4) is belongs to user segments indicated by the list in line 5. In the example, each "segment" is indicated by a unique segment identifier, which refers to a set of previously-specified query conditions. The query request is then submitted to a query evaluation system (line 9), which may be an embodiment of the user segment query service 240 of FIG. 2B.

TABLE A

Client Code to Issue Query Request

```
1:    EvaluationConfiguration c = new RealtimeLatencyConfig( );
2:    c.setOverallLatency(50);
3:
4:    request.setUserID("bob");
5:    request.setSegmentIDs(Lists.of(111, 222, 333));
6:    request.setConfig(c);
7:
8:    querySystem.setResponseListener(listener);
9:    querySystem.evaluate(request);
```

As shown above at line 8, the client sets a listener component to receive the response from the query evaluation system in real time. The response will be returned to that listener according to the specified latency constraint (e.g. within 50 milliseconds of submitting the request).

As shown in the above example, the latency constraint is represented as an object of a class EvaluationConfigruation (line 1). In some embodiments, this class may be implemented as an extendable class (e.g. an abstract class or interface in Java) that can be extended to incorporate additional configuration information. In this manner, the API of the query evaluation system can be evolved over time to change the way that the latency constraint is specified, while maintaining backward compatibility to latency constraint objects of legacy clients.

FIG. 5B depicts another embodiment of the Boolean query evaluation system 130 having a query interface such as interface 135. In this example, the query interface allows a type of request 540 that specifies a Boolean query 542 and a list of data source latency constraints 544*a-n*. Thus, in this example, the client has knowledges about some of the underlying data sources that will be accessed by the query evaluation system, and has specified latency constraints (e.g. wait times) for these data sources as part of the query request.

As shown, the query evaluation system 130 will evaluate 550 the query 542 according to the data source latency constraints 544*a-n* specified by the request. For example, instead of calculating the wait times for external data sources (e.g. in the process discussed in connection with FIG. 3), the query evaluation system may simply use the specified latency constraints 544*a-n* as the data source wait times. The query evaluation will be carried out under these constraints to generate response 560. The response 560 may indicate an answer to the Boolean query, which may be a complete Boolean answer, a partial Boolean answer, or an error. In some embodiments, the response 560 may also indicate a list of reasons 562 for a partial answer, which may indicate which specific ones of the data source latencies 544*a-n* led to the partial answer.

Figure 6:
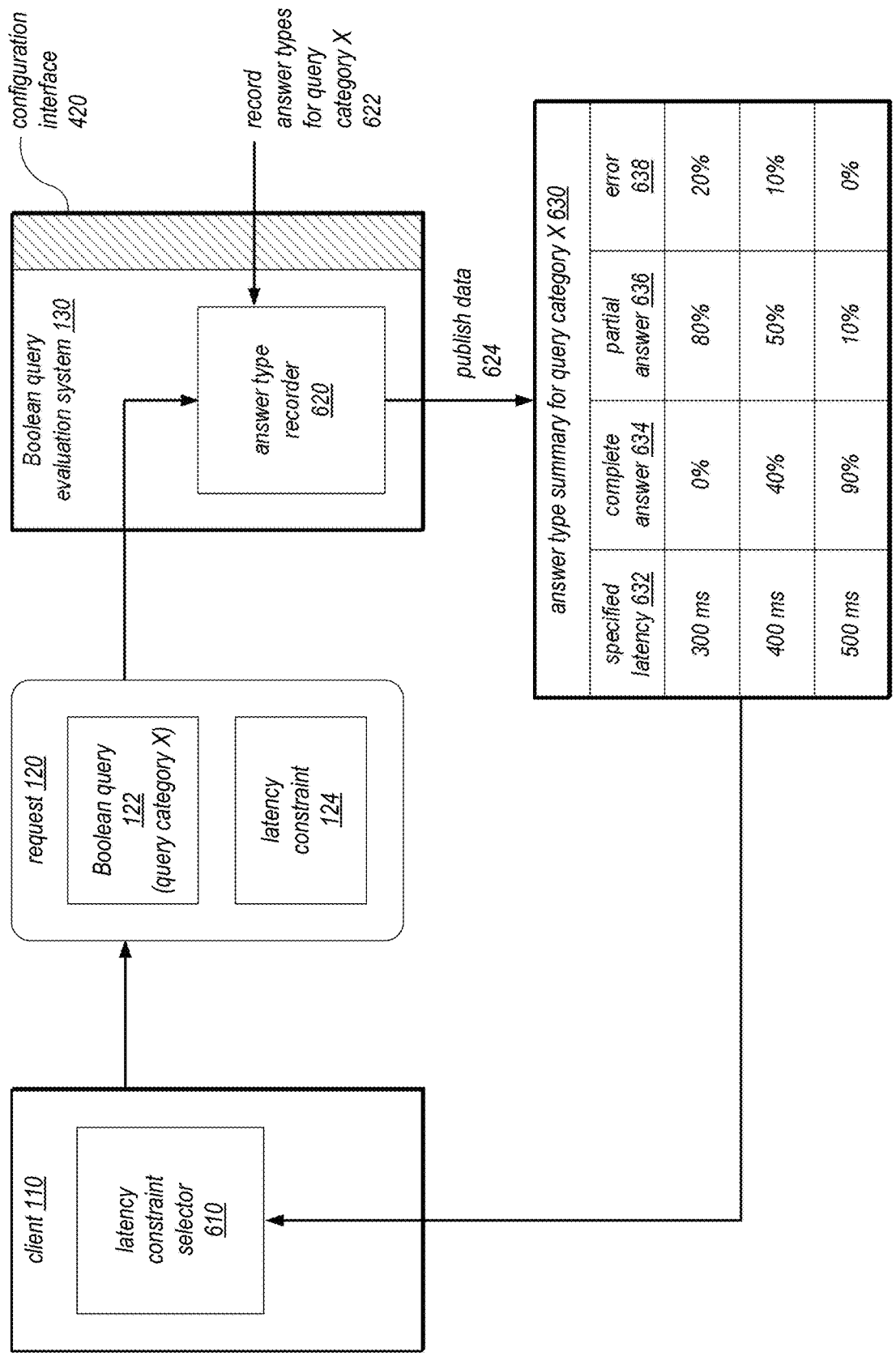
FIG. 6 illustrates a feature of the Boolean query evaluation system to build and publish an answer type summary for a particular category of queries, according to some embodiments.

FIG. 6 illustrates a feature of the Boolean query evaluation system to build and publish an answer type summary for a particular category of queries, according to some embodiments.

In some embodiments, the Boolean query evaluation system 130 may be configured to capture the specified latency constraints and returned answer types (e.g. complete or partial answers) for a category of Boolean queries. The captured data can be summarized and then published to aid clients in selecting latency constraint for future queries.

The Boolean query evaluation system 130 in this example is configured 622 to record answer types of a particular category of queries. For example, query category X may include a sample of queries that are issued from a particular client, that contain a particular set of query conditions, that are directed to a particular data item, etc. As shown, the query evaluation system may use an answer type recorder component 620 to record the answers for the sampled queries from the category. In some embodiments, the answer type recorder 620 may be configured to record answer type data for many categories of queries specified via the configuration interface 420 (e.g., query categories for different clients).

The client 110 in this example issues a query request 120 to the Boolean query evaluation system 130. The request specifies a Boolean query 122 and a latency constraint 124, as discussed in connection with FIG. 1. The Boolean query 122 in this case belongs to query category X, which is a category that the answer type recorder 620 has been configured to capture and publish 624.

As shown, the published data in this example is an answer type summary table 630 for query category X. The summary indicates the different types of latencies 632 that were observed for queries in the category, and for each, a distribution of different answer types that were returned for those queries. In this example, the summary indicates the respective percentages of queries that resulted in a complete answer 634, a partial answer 636, or an error 638. In some embodiments, the contents of the summary 630 may be updated for queries of category X processed by the query evaluation system. In some embodiments, the contents of the summary 630 may be limited to a most recent time window (e.g. the last 24 hours), so that the published data represents the most recent behavior of the query evaluation system.

The answer type summary data 630 may be used in a variety of ways. In some embodiments, the summary data 630 may simply be published so that it can be used by the owners of the client systems to configure the latency constraints used by the clients. In some embodiments, the published information may be provided as part of a dynamically defined service level agreement (SLA) provided by the query evaluation system. For example, the SLA may guarantee different levels of service based on the changing contents of the summary. In some embodiments, some clients may implement a component such as the latency constraint selector 610. Such a component may be used to automatically and programmatically select the latency constraint 124 for queries based on the current contents of the summary 630. For example, if the client 110 needed a complete answer for a next Boolean query, the selector component 610 may choose to use 500 milliseconds as the latency constraint, since the summary indicates that recent queries with that latency value received a complete answer from the query evaluation system 90% of the time.

Figure 7:
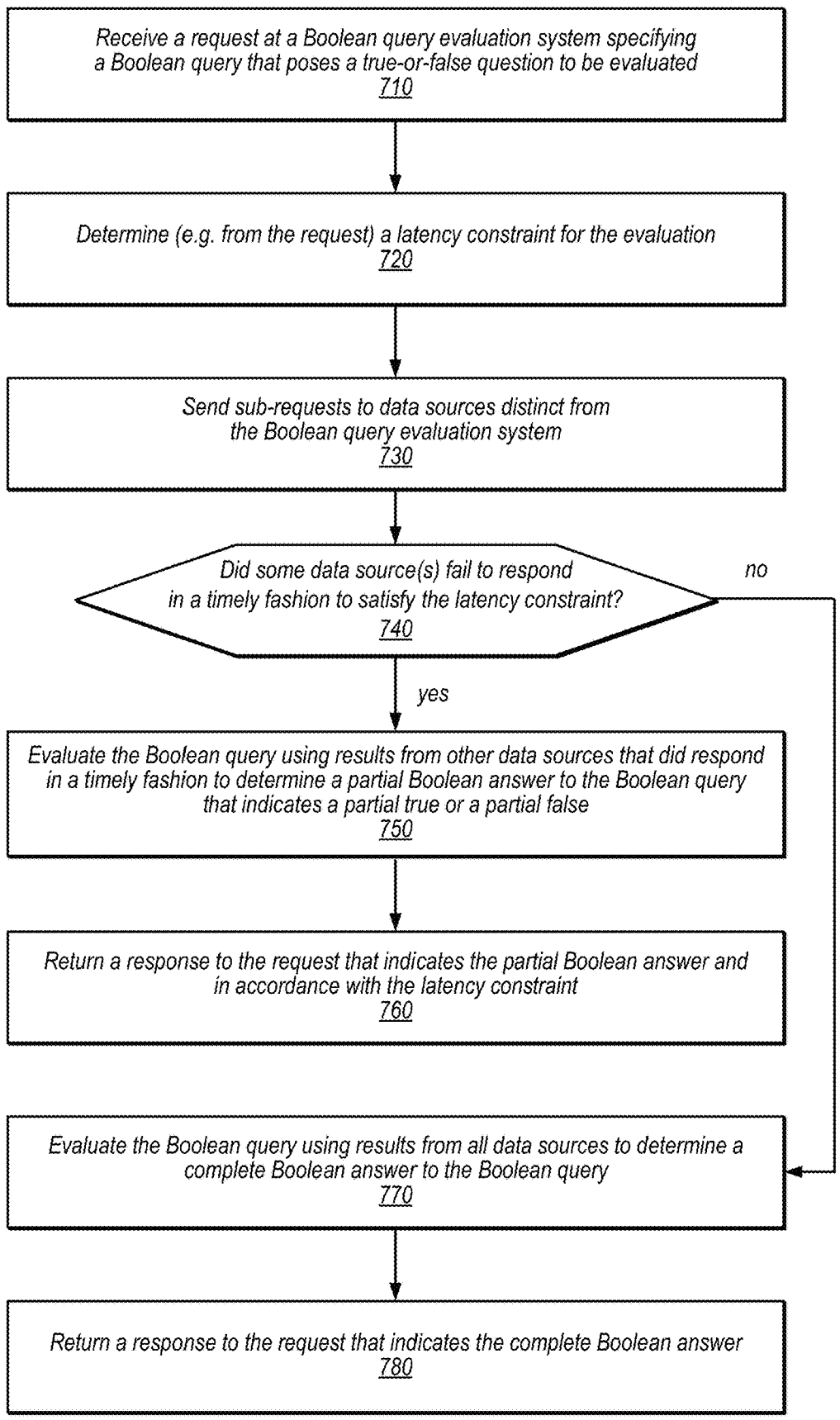
FIG. 7 is a flowchart illustrating a process of evaluating a Boolean query in a Boolean query evaluation system that returns partial Boolean answers for Boolean queries according to client-specified latency constraints, according to some embodiments.

FIG. 7 is a flowchart illustrating a process of evaluating a Boolean query in a Boolean query evaluation system that returns partial Boolean answers for Boolean queries according to client-specified latency constraints, according to some embodiments. The depicted process may be performed by an embodiment of the Boolean query evaluation system 130 of FIG. 1.

The process begins at operation 710, where a request is received at the Boolean query evaluation system. In some embodiments, the request may be request 120 of FIG. 1. The request may specify a Boolean query (e.g. Boolean query 122) that poses a true-or-false question to be evaluated by the Boolean query evaluation system. In some embodiments, the request may be received via a query interface (e.g. query interface 135), which may be implemented as a user interface (e.g. a GUI), a programmatic interface (e.g. an API), or some other type of query interface.

At operation 720, a latency constraint is determined for the evaluation. For example, the latency constraint (e.g. latency constraint 124 of FIG. 1) may be specified as part of the incoming request. In some embodiments, the latency constraint may specify a latency period for the query response to be provided the query evaluation system. In some embodiments, the latency constraint may not specify a concrete value, but rather a formula that is based on other runtime variables.

At operation 730, the query evaluation system sends sub-requests to external data sources that are distinct from the query evaluation system. The sub-requests are used to fetch data that are needed during the query evaluation process. The external data sources (e.g. data sources 170a-c of FIG. 1) may be computing systems (e.g. data services, databases, etc.) that operate independently from the query evaluation system. In some embodiments, the sub-requests may be sent to the data sources via respective data source interfaces implemented by the query evaluation system (e.g. interfaces 162a-c of FIG. 1).

At operation 740, the query evaluation system determines whether some of the data sources failed to respond to its sub-request in a timely fashion to satisfy the latency constraint. In some embodiments, the data source interfaces are configured to wait for a response from their respective data sources for a specified amount of wait time. As discussed in connection with FIG. 3, the wait period for each data source may be dynamically calculated based on the specified latency constraint. If the wait period for a data source passes without the data source providing a response, that data source will be deemed to have failed to provide a timely response.

If some data sources failed to respond in a timely manner, at operation 750, the Boolean query is evaluated using results from those data sources that did provide a timely response. Based on this incomplete data, the evaluation will produce a partial Boolean answer to the query (e.g. answer 182 of FIG. 1), which will indicate a partial true or partial false. The partial answer may indicate the most probable answer based on the incomplete data that was obtained from the external data sources. At the same time, the partial answer will indicate to the client that the answer is based on incomplete information.

At operation 760, a response (e.g. response 180 of FIG. 1) is returned for the query request indicating the partial Boolean answer. The response will be returned in accordance with the specified latency constraint (e.g. within a latency period specified by the latency constraint). In some embodiments, the response will also indicate a reason field (e.g. field 184) that indicates a reason or additional information about why the returned answer is partial. For example, the reason field may identify the data source(s) that had failed to provide timely responses during query evaluation. In some embodiments, the response may include a confidence level indicator (e.g. a confidence score), which is calculated during the query evaluation to indicate the certainty of the partial answer. In some embodiments, the response may include a retry indicator (e.g. indicator 186) that provides a recommendation as to whether the query should be retried to obtain a more precise answer. In some embodiments, the retry indicator may provide a recommended latency constraint to be used for the retry request.

In some embodiments, if the query evaluation system is not able to obtain a minimum threshold of data from the external data sources, the query evaluation system will return an error (e.g. error 472) instead of a partial answer. For example, an error may be returned if none of the external data sources returned a timely response, or if one or more required data sources (e.g. data source X of FIG. 4C) did not return a timely response. In some embodiments, when an error is returned as an answer, the query evaluation system may also provide an associated reason for the error or an retry indicator in the query response. In some embodiments, the query evaluation system may be configured to return different error types (e.g. retriable or non-retriable errors, errors of different severity levels, etc.), which may be used to encode the reason field and/or the retry indicator.

If all of the data sources provided time responses to the query evaluation system during query evaluation, the process proceeds to operation 770. At operation 770, the Boolean query is evaluated using results fetched from all of the data sources to determine a complete Boolean answer to the Boolean query (a true or a false). At operation 780, a response is returned to the client indicating the complete Boolean answer. In some embodiments, when a Boolean query is completely evaluated under the specified latency constraint, the query evaluation system will return a complete Boolean answer to the query. In some embodiments, if a complete answer is successfully determined, the query evaluation service will not populate the reason field or the retry indicator in the query response.

Figure 8:
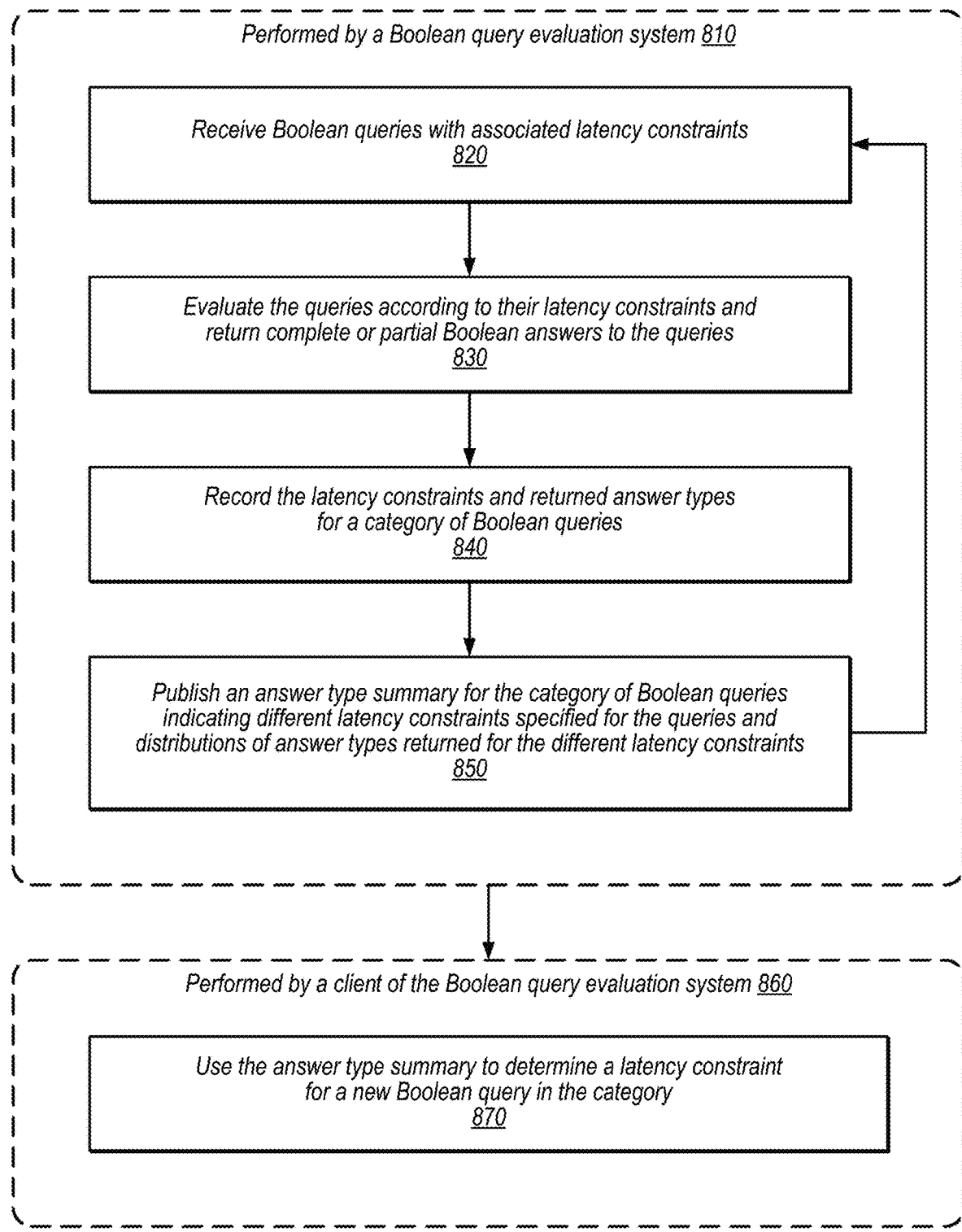
FIG. 8 is a flowchart illustrating a process of the Boolean query evaluation system building and publishing an answer type summary for a category of queries, according to some embodiments.

FIG. 8 is a flowchart illustrating a process of the Boolean query evaluation system building and publishing an answer type summary for a category of queries, according to some embodiments.

As shown in this example, operations 820, 830, 840, and 850 are performed 810 by a Boolean query evaluation system (e.g. the Boolean query evaluation system 130 of FIG. 1). At operation 820, Boolean queries are received by the query evaluation system with associated latency constraints. At operation 830, the queries are evaluated by the system according to their latency constraints. The system then returns either complete or partial Boolean answers for the queries back to their issuing clients. Operations 820 and 830 may be performed in a similar manner as described in connection with FIG. 7.

At operation 840, the latency constraints and the returned answer types for a particular category of queries are recorded. In some embodiments, operation 840 may be performed by a component such as the answer type recorder 620 of FIG. 6. The recorder component may be configured to capture answer type information for a specified category of received queries (e.g. specified via the configuration interface 420). The captured information may be summarized and stored in an answer type summary data structure (e.g. the answer type summary table 630 of FIG. 6).

At operation 850, the answer type summary for the category of Boolean queries is published. As shown in the summary structure 630 of FIG. 6, the answer type summary structure may indicate different latency constraints that were observed for queries in the category and distributions of answer types (e.g. complete answers, partial answers, and errors) that were returned for the different latency constraints. The summary data thus captures how different values of the latency constraint affect the resulting answers produced by the query evaluation system.

As shown, operation 870 may be performed 860 by a client (e.g. client 110) of the Boolean query evaluation system. At operation 870, the client uses the published answer type summary data to determine a latency constraint for a new Boolean query of the category. The determination may be made programmatically using a component such as the latency constraint selector 610 of FIG. 6. In some embodiments, the latency constraint selection component may be implemented as part of the query evaluation system. For example, the query evaluation system may determine a service level associated with the client (e.g. as specified in an SLA), and automatically determine the latency constraint to use based on client's service level and the answer type summary data.

Figure 9:
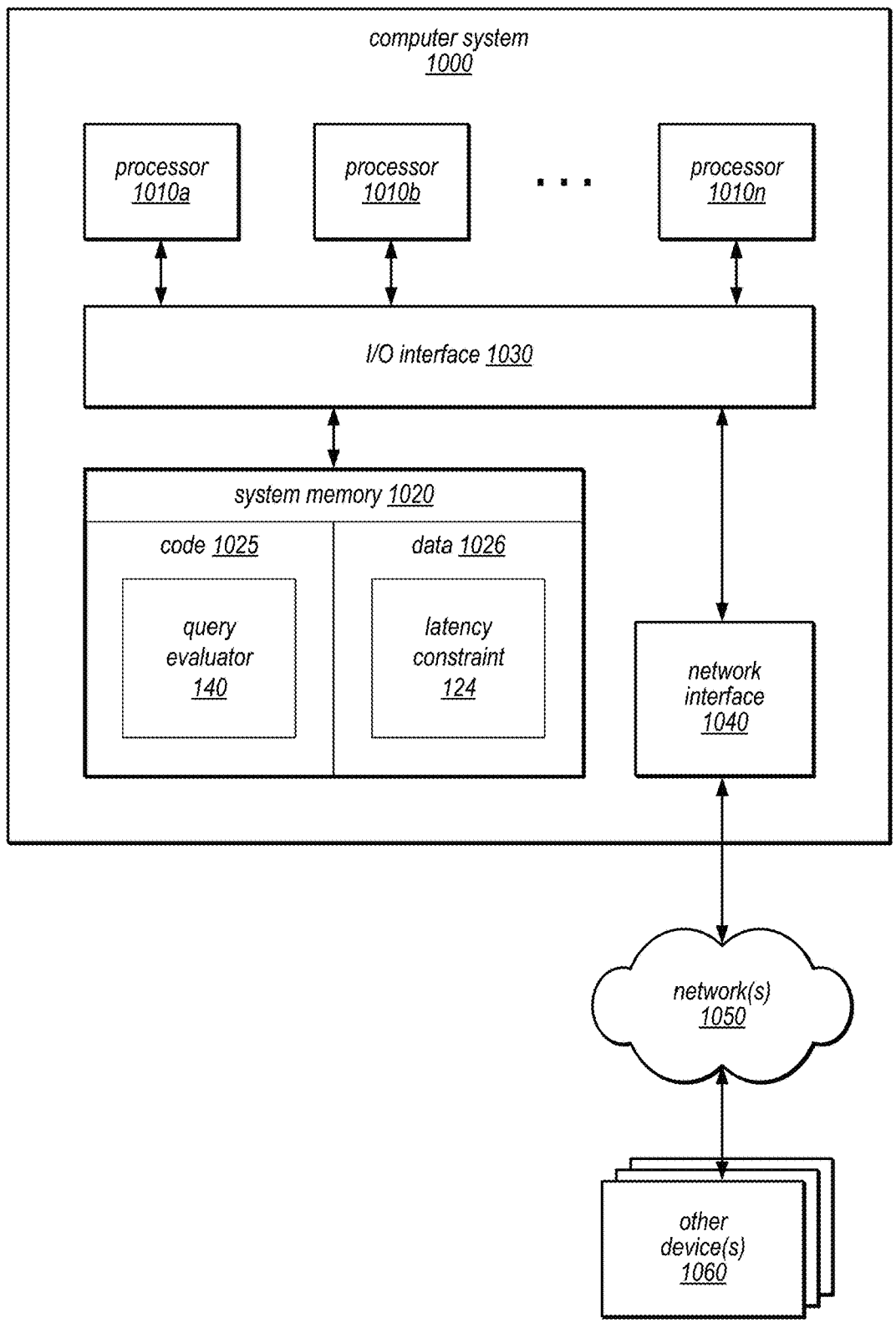
FIG. 9 is a block diagram illustrating an example computer system that can be used to implement one or more portions of a Boolean query in a Boolean query evaluation system that returns partial Boolean answers for Boolean queries according to client-specified latency constraints, according to some embodiments.

FIG. 9 is a block diagram illustrating an example computer system that can be used to implement one or more portions of a Boolean query in a Boolean query evaluation system that returns partial Boolean answers for Boolean queries according to client-specified latency constraints, according to some embodiments.

The depicted computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. As shown, computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the systems described herein.

In the illustrated embodiment, computer system 1000 also includes one or more other devices 1060, which may include persistent storage devices and/or I/O devices. In various embodiments, persistent storage devices may correspond to disk drives, tape drives, solid state memory, other mass storage devices, or any other persistent storage device. Computer system 1000 (or a distributed application or operating system operating thereon) may store instructions and/or data in persistent storage devices, as desired, and may retrieve the stored instruction and/or data as needed. For example, in some embodiments, computer system 1000 may implement a node of the Boolean query evaluation system disclosed herein.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions or code 1025 may include instructions executable to implement executable components of the Boolean query evaluation system, such as the query evaluator component 140. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040. In some embodiments, system memory 1020 may include data store 1026, which may be configured as described herein. For example, the information stored in the data store may include the latency constraint 124 received by the Boolean query evaluation system.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems. In addition, network interface 1040 may allow communication between computer system 1000 and various other devices 1060, such as I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more hardware processors with associated memory that implement a Boolean query evaluation system, configured to:
receive a Boolean query that poses a true-or-false question to be evaluated;
determine a latency constraint for the evaluation;
respond to the Boolean query, including to:
send sub-requests to a plurality of data sources distinct from the Boolean query evaluation system;
determine that one or more of the data sources failed to respond to one or more respective sub-requests in time to satisfy the latency constraint;
evaluate the Boolean query using one or more results from one or more of the data sources that did respond in time to satisfy the latency constraint to determine a partial Boolean answer to the Boolean query, wherein the partial Boolean answer is a partial true or a partial false;
calculate a confidence level of the partial Boolean answer based at least in part on a number of data sources that failed to respond in time to satisfy the latency constraint, wherein the confidence level is above a confidence threshold; and
return, in accordance with the latency constraint and based at least in part on the confidence level, a response to the Boolean query that indicates the partial Boolean answer.

2. The system of claim 1, wherein the Boolean query evaluation system is configured to:
receive the Boolean query and the latency constraint as part of a single request.

3. The system of claim 2, wherein the Boolean query evaluation system is configured to:
receive a second request that specifies a second Boolean query without an associated latency constraint; and
evaluate the second Boolean query according to a previously configured default latency constraint.

4. The system of claim 1, wherein the Boolean query evaluation system is configured to:
indicate in the response one or more reasons for the partial Boolean answer, including the one or more data sources that failed to respond in time.

5. The system of claim 1, wherein:
the Boolean query asks whether a particular user belongs in a particular user segment; and
the system further comprises one or more hardware processors with associated memory that implement a client of the Boolean query evaluation system, the client configured to select personalized content for the particular user based at least in part on the response to the Boolean query.

6. A method, comprising:
performing, by one or more hardware processors with associated memory that implement a Boolean query evaluation system:
receiving a Boolean query that poses a true-or-false question to be evaluated, and in response:
sending sub-requests to a plurality of data sources distinct from the Boolean query evaluation system, wherein one or more of the data sources fails to respond to one or more respective sub-requests in time to satisfy a latency constraint associated with the Boolean query;
evaluating the Boolean query using one or more results from one or more of the data sources that did respond in time to satisfy the latency constraint to determine a partial Boolean answer to the Boolean query, wherein the partial Boolean answer is a partial true or a partial false;
calculating a confidence level of the partial Boolean answer based at least in part on a number of data sources that failed to respond in time to satisfy the latency constraint, wherein the confidence level is above a confidence threshold; and
returning, in accordance with the latency constraint and based at least in part on the confidence level, a response to the Boolean query that indicates the partial Boolean answer.

7. The method of claim 6, wherein:
the Boolean query is received with the latency constraint as part of a single request to the Boolean query evaluation system.

8. The method of claim 7, further comprising performing, by the Boolean query evaluation system:
receiving a second request that specifies a second Boolean query without an associated latency constraint; and
evaluating the second Boolean query according to a previously configured default latency constraint.

9. The method of claim 7, further comprising performing, by the Boolean query evaluation system:
  receiving a second request that specifies a second Boolean query with a second latency constraint;
  determining that the second latency constraint exceeds a previously configured maximum latency period; and
  evaluating the second Boolean query according to the previously configured maximum latency period instead of the second latency constraint.

10. The method of claim 6, further comprising performing, by the Boolean query evaluation system:
  indicating the confidence level of the partial Boolean answer in the response.

11. The method of claim 6, further comprising performing, by the Boolean query evaluation system:
  determining that the one or more of the data sources that failed to respond in time to satisfy the latency constraint is capable of responding under a different latency constraint; and
  including in the response a recommendation to retry the Boolean query with the different latency constraint.

12. The method of claim 6, wherein:
  the Boolean query includes multiple sub-queries posing true-or-false questions;
  sending the sub-requests to the plurality of data sources comprises sending the individual ones of the sub-queries to the plurality of data sources; and
  evaluating the Boolean query comprises aggregating results of the sub-queries returned form the data sources.

13. The method of claim 6, further comprising performing, by the Boolean query evaluation system:
  determining, based at least in part on the latency constraint, respective wait periods to wait for responses from individual ones of the data sources.

14. The method of claim 6, further comprising performing, by the Boolean query evaluation system:
  determining that a first data source did not respond to a sub-request in time to satisfy the latency constraint; and
  using a second data source to evaluate the Boolean query in place of the first data source, wherein the second data source stores a lagging offline copy of data in the first data source.

15. The method of claim 6, further comprising performing, by the Boolean query evaluation system:
  recording latency constraints specified for a category of Boolean queries and types of answers returned for the Boolean queries in the category; and
  publishing an answer type summary for the category of Boolean queries indicating different latency constraints specified for the Boolean queries and distributions of answer types returned for individual ones of the different latency constraints.

16. One or more non-transitory computer-accessible storage media storing program instructions that when executed on or across one or more processors implement at least portion of a Boolean query evaluation system and cause the Boolean query evaluation system to:
  receive a Boolean query that poses a true-or-false question to be evaluated, and in response:
    send sub-requests to a plurality of data sources distinct from the Boolean query evaluation system, wherein one or more of the data sources fails to respond to one or more respective sub-requests in time to satisfy a latency constraint associated with the Boolean query;
    evaluate the Boolean query using one or more results from one or more of the data sources that did respond in time to satisfy the latency constraint to determine a partial Boolean answer to the Boolean query, wherein the partial Boolean answer is a partial true or a partial false;
    calculate a confidence level of the partial Boolean answer based at least in part on a number of data sources that failed to respond in time to satisfy the latency constraint, wherein the confidence level is above a confidence threshold; and
    return, in accordance with the latency constraint and based at least in part on the confidence level, a response to the Boolean query that indicates the partial Boolean answer.

17. The one or more non-transitory computer-accessible storage media of claim 16, wherein the program instructions when executed on or across the one or more processors cause the Boolean query evaluation system to:
  receive the Boolean query with the latency constraint as part of a single request to the Boolean query evaluation system.

18. The one or more non-transitory computer-accessible storage media of claim 17, wherein to receive the latency constraint, the program instructions when executed on or across the one or more processors cause the Boolean query evaluation system to:
  receive the latency constraint as a configuration object that specifies a latency period, wherein the configuration object is an instance of an extendable class.

19. The one or more non-transitory computer-accessible storage media of claim 16, wherein the program instructions when executed on or across the one or more processors cause the Boolean query evaluation system to:
  receive a second Boolean query with an associated second latency constraint, and in response:
    determine that a particular one of the data sources failed to respond in time to satisfy the second latency constraint;
    determine that the particular data source is a required data source for evaluation of the second Boolean query; and
    return an error response to the second Boolean query.

20. The one or more non-transitory computer-accessible storage media of claim 18, wherein the program instructions when executed on or across the one or more processors cause the Boolean query evaluation system to:
  indicate in the response one or more reasons for the partial Boolean answer, including the one or more data sources that failed to respond in time.

* * * * *